United States Patent [19]
Hase et al.

[11] Patent Number: 5,222,002
[45] Date of Patent: Jun. 22, 1993

[54] SEMICONDUCTOR INTEGRATED CIRCUIT WHICH PERFORMS PHASE SYNCHRONIZATION

[75] Inventors: Kenichi Hase; Shoichi Miyazawa; Ryutaro Horita, all of Yokohama; Shinichi Kojima, Takasaki, all of Japan

[73] Assignee: Hitachi, Ltd., Tokyo, Japan

[21] Appl. No.: 687,638

[22] Filed: Apr. 19, 1991

[30] Foreign Application Priority Data

Apr. 19, 1990 [JP] Japan ................................. 2-103314

[51] Int. Cl.⁵ .............................................. G11B 5/02
[52] U.S. Cl. ......................................... 360/46; 360/39
[58] Field of Search ................................... 360/46, 39

[56] References Cited
U.S. PATENT DOCUMENTS

5,119,244 6/1992 Hardeng ............................... 360/46

Primary Examiner—David Mis
Attorney, Agent, or Firm—Antonelli, Terry, Stout & Kraus

[57] ABSTRACT

Pulse detector and a data separator are integrated on a single chip semiconductor integrated circuit. In the pulse detector, an input stage of a gain variable amplifier, which amplifies an input signal applied thereto so as to have a constant peak, includes a bipolar transistor, and a pulse generator for generating a pulse shape signal according to a differential value of an output from the gain variable amplifier includes a Bi-CMOS gate or a CMOS gate. In the data separator, a voltage controlled oscillator for generating a clock signal includes a bipolar transistor. A frequency phase comparator for comparing the pulse shape signal in phases with the clock signal generated by the voltage controlled oscillator to obtain a phase difference, includes a Bi-CMOS gate and a CMOS gate.

9 Claims, 11 Drawing Sheets

SEMICONDUCTOR INTEGRATED CIRCUIT WHICH PERFORMS PHASE SYNCHRONIZATION

BACKGROUND OF THE INVENTION

1. Field of the Invention

This invention relates to a semiconductor integrated circuit which performs phase synchronization, and more particularly to a semiconductor integrated circuit which is suitable for use in a magnetic disk system.

2. Description of the Related Art

In recent years, it has been made various attempts to reduce the number of circuit components and improve the performance and function by large-scale integration of electrical circuits.

Generally, in the functional section which deals with analog signals, it is advantageous that the circuit for dealing with analog signals comprises a bipolar transistor circuit in view of its precision and frequency band. However, of such an analog section, data signal circuits deal with high-frequency signals and hence require an amplifying circuit of very wide frequency band and high precision so that the amount of electrical power consumption would necessarily increase, thus making the integration difficult.

Thus regarding the functional section which deals with analog signals, it has been currently difficult to attain both the high performance and the high integration together. Consequently, in the conventional technology, the section which requires a high precision and a high frequency band was provided in the form of plurality LSI chips manufactured by bipolar processes.

For example, in the conventional magnetic disk system, semiconductor integration of a pulse shaping circuit dealing with analog signals, and of a phase synchronizing block dealing with digital signals analogously was realized as a plurality of LSI chips.

However, this conventional semiconductor integration would not reduce the number of component parts of the signal circuit block so that it would be difficult to realize reduction of the apparatus size and improvement of the performance.

Further, because of plural LSI chips, the amount of electrical power consumption of buffers for inputs/outputs of the LSI circuits was large. Signal lines between the LSI circuits were apt to interfere with each other via a substrate.

A solution of the problems was proposed by Japanese Patent Laid-Open Publication No. 274516/1989 which corresponds to U.S. application Ser. No. 07/392,552 for "Data separator and signal processing circuit". According to these applications, a part of a data separator is manufactured by a Bi-CMOS process, thereby the data separator could be included in one chip. However, a pulse generator could not be included in the same chip as the data separator was composed. Therefore, all the problems described above could not be solved.

SUMMARY OF THE INVENTION

It is therefore an object of this invention to provide a semiconductor integrated circuit, in which a pulse shaping circuit dealing with analog signals and a phase synchronizing block dealing with digital signals analogously are incorporated in a single chip, thus attaining an improved degree of performance.

According to a first aspect of the invention, there is provided a semiconductor integrated circuit which performs phase syncronization, comprising: (a) a pulse shaping circuit for transforming an input analog signal into a pulse shape signal; and (b) a phase synchronizing circuit for generating a clock synchronous with the pulse shape signal, said semiconductor integrated circuit being manufactured by a Bi-CMOS process.

According to a second aspect of the invention, there is provided a semiconductor integrated circuit which performs phase syncronization, comprising: (a) a pulse shaping circuit for transforming an input analog signal into a pulse shape signal; and (b) a phase synchronizing circuit for generating a clock synchronous with the pulse shape signal, said pulse shaping circuit and said phase synchronizing circuit each comprising a plurality of functional circuits each of which includes, depending on a characteristic required for the respective function of the functional circuit, either one of a bipolar transistor and a CMOS gate.

According to a third aspect of the invention, there is provided a semiconductor integrated circuit which performs phase syncronization, comprising: (a) a pulse shaping circuit including 1) a gain variable amplifier having a bipolar transistor for amplifying an input analog signal so as to have a constant peak value, 2) a differentiating amplifier for generating a differentiation signal of the output signal from said gain variable amplifier, and 3) a pulse generator having either one of a Bi-CMOS gate and a CMOS gate for generating a pulse shape signal from the differentiation signal; and (b) a phase synchronizing circuit including 1) a voltage controlled oscillator having a bipolar transistor for generating a clock signal, 2) a frequency phase comparator having a Bi-CMOS gate or a CMOS gate for comparing the pulse shape signal, which is generated by said pulse shaping circuit, in phases with the clock signal which is generated by said voltage controlled oscillator to obtain a phase difference therebetween, 3) a charge pump for generating a current to be converted into a voltage for controlling a clock frequency of said voltage controlled oscillator, corresponding to the phase difference obtained by said frequency phase comparator.

In the semiconductor integrated circuits as described above, the input analog signal is an encoded data signal, and the semiconductor integrated circuit further comprises a decoding circuit for decoding the encoded data signal by using the clock signal generated by said phase synchronizing circuit.

According to a fourth aspect of the invention, there is provided a semiconductor integrated circuit for producing data with input signal applied thereto, comprising: (a) a pulse shaping circuit including 1) a gain variable amplifier having a bipolar transistor for amplifying the input signal so as to have a constant peak value, 2) a differentiating amplifier for generating a differentiation signal on the basis of an output signal from said gain variable amplifier, and 3) a pulse generator having a Bi-CMOS gate or a CMOS gate for generating a pulse shape signal from the differentiation signal; (b) a phase synchronizing circuit including 1) a voltage controlled oscillator having a bipolar transistor for generating a clock signal, 2) a frequency phase comparator having a Bi-CMOS gate or a CMOS gate for comparing the pulse shape signal, which is generated by said pulse shaping circuit, in phases, with the clock signal, which is generated by said voltage controlled oscillator to obtain a phase difference therebetween, 3) a charge pump for generating a current to be converted into a voltage for controlling a pulse frequency of said voltage controlled oscillator, corresponding to the phase difference obtained by said frequency phase comparator; and (c) a data syncronizing circuit having a Bi-CMOS gate or a CMOS gate for producing said synchronized date from the pulse shape signal by employing a window which is formed according to the clock signal.

The semiconductor circuit described above further comprises a decoding circuit for decoding the syncronized data by using the clock signal generated by the phase synchronizing circuit.

According to a fifth aspect of the invention, there is provided a magnetic disk system comprising: (I) a magnetic disk on which data is recorded; (II) a magnetic head for reading the data recorded on the magnetic disk; (III) a semiconductor integrated circuit wherein a synchronized read data is produced from the read signal which is read from the magnetic disk, comprising: (a) a pulse shaping circuit including i) a gain variable amplifier having a bipolar transistor for amplifying the read signal so as to have a constant peak value, ii) a differentiating amplifier for generating a differentiation signal on the basis of the output signal from said gain variable amplifier, and iii) a pulse generator having a Bi-CMOS gate or a CMOS gate for generating a pulse shape signal from the differentiation signal; (b) a phase synchronizing circuit including i) a voltage controlled oscillator having a bipolar transistor for generating a clock signal, ii) a frequency phase comparator having a Bi-CMOS gate or a CMOS gate for comparing the pulse shape signal, which is generated by said pulse shaping circuit, in phase difference with the clock signal, which is generated by said voltage controlled oscillator to obtain a phase difference therebetween, and iii) a charge pump for generating a current to be converted into a voltage for controlling a frequency of said voltage controlled oscillator corresponding to the phase difference obtained by said frequency phase comparator; and (c) a data syncronizing circuit for producting said synchronized read date from the pulse shape signal by employing a window which is formed according to the clock signal; and (III) a decoding circuit for decoding the syncronized date by using the clock signal generated by said phase synchronizing circuit.

Thus the voltage controlled oscillator and the gain variable amplifier can be improved in performance especially at a high frequency band. The pulse generator and the phase comparator, which do not require so high performance, include a Bi-CMOS gate or a CMOS gate, attaining large-scale integration and low consumption.

The above and other advantages, features and additional objects of this invention will be manifest to those versed in the art upon making reference to the following detailed description and the accompanying drawings in which some preferred embodiments incorporating the principles of this invention are shown by way of illustrative example.

DETAILED DESCRIPTION OF THE PREFERRED EMBODIMENTS

The principles of this invention are particularly useful when embodied in a semiconductor integrated circuit in which a pulse shaping circuit, an encoder, a decoder and a phase synchronizing circuit are integrated on a semiconductor chip and are adapted to be used in a magnetic disk system. The semiconductor integrated circuit is generally shown in FIG. 1.

Figure 1:
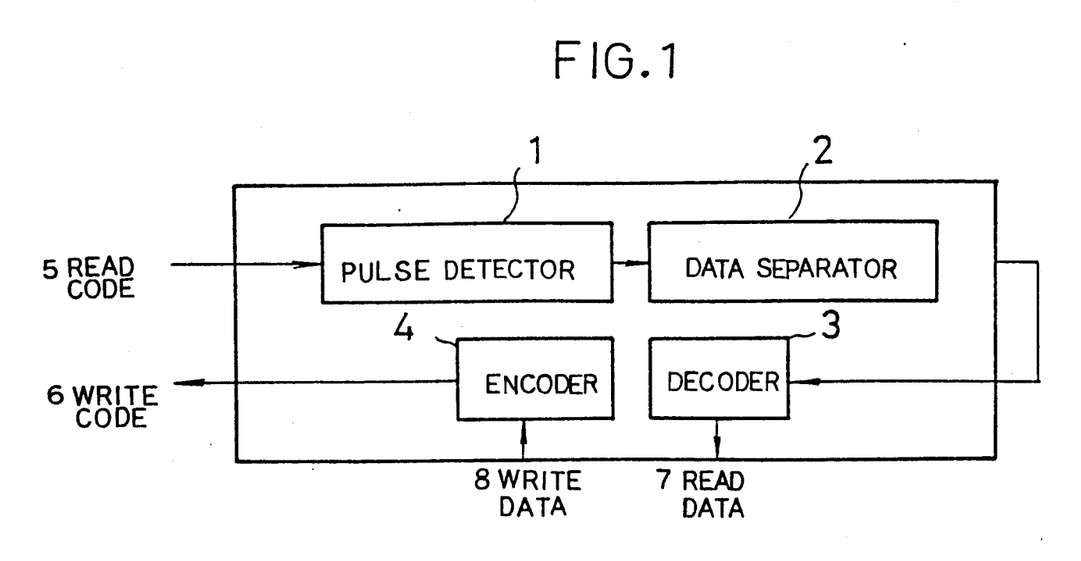
FIG. 1 is a block diagram showing a semiconductor integrated circuit embodying this invention.

In FIG. 1, reference numeral 1 designates a pulse detector as a pulse shaping circuit; 2, a data separator including a phase syncronizing circuit; 3, a decoder; and 4, an encoder.

The semiconductor integrated circuit is manufactured by a Bi-CMOS process. As described below, a bipolar transistor, a CMOS gate or a Bi-CMOS gate is selectively used, depending on the individual circuit or section.

The operation of the semiconductor integrated circuit will now be described.

In a magnetic disk system, an output signal read from a disk by a head is amplified by a read/write amplifier, and the amplified output signal is inputted as a read code 5.

The pulse detector 1 detects the position of a peak of the read code 5. The position of the peak corresponds to a position at which the polarity of the magnetization is inverted. The pulse detector converts the peak position into a pulse output, and outputs the pulse output to the data separator 2.

The data separator 2 comprises a PLL (Phase Locked Loop) having therein an oscillator, and generates a clock synchronous with the pulse output generated by the pulse detector 1.

Thus the pulse output generated by the pulse detector 1 is taken in by the clock generated by the data separator 2, and subsequently the pulse output can be processed as a digital signal.

Specifically, a signal digitized by the pulse detector 1 and the data separator 2 is decoded by the decoder 3, and the decoded digital signal is then outputted as read data 7. When storing data, write data 8 is converted into a record code by the encoder 4, and is outputted as a write code 6 to the read/write amplifier.

Usually, the data to be stored in the disk is converted into one of various kinds of record code (e.g., MFM, 2-7RLLC and 1-7RLLC) suitable for the data recording. The encoder 4 represents a logic circuit for converting the data into a record code, and the decoder 3 represents a logic circuit for decoding the record code into the data.

Figure 2:
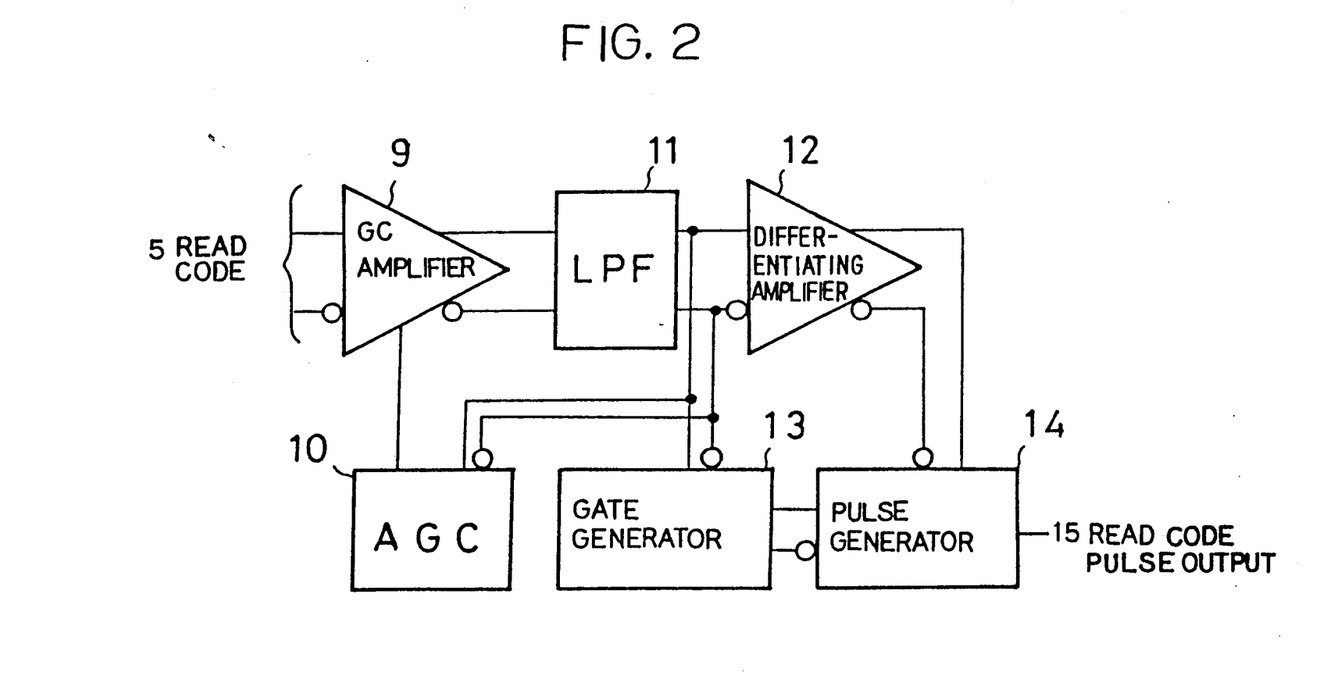
FIG. 2 is a block diagram showing a pulse detector (pulse shaping circuit)

As shown in FIG. 2, the pulse detector 1 includes a GC amplifier (Gain Control Amplifier) 9, an AGC (Automatic Gain Control) 10, an LPF (Low-Pass Filter) 11, a differentiating amplifier 12, a gate generator 13 and a pulse generator 14.

The read code 5 is a differential analog signal from the read/write amplifier. This signal is the output only amplified by the read/write amplifier from the output waveform obtained from the head, varying in amplitude due to the kind of a disk medium, the position (i.e., inner circle or outer circle), the kind of the head, the gain of the read/write amplifier, a bit density, etc. The GC amplifier 9 is for amplifying the signal so as to keep the amplitude to a constant value, and the AGC 10 controls the GC amplifier 9 so as to vary the gain of the GC amplifier 9 normally to keep the amplitude of the amplified signal to a constant value, irrespective of the amplitude of the input read code 5.

Further, the high frequency component of the output of the GC amplifier 9 is cut by the LPF 11, and the peak of the output is detected by the differentiating amplifier 12.

The gate generator 13 prevents the differentiating amplifier 12 from detecting the peak with respect to the noise on a shouldering waveform base line. The gate generator 13 outputs a gate signal at a portion at which the output of the LPF 11 whose output is to be inputted to the differentiating amplifier 12 is over the predetermined value of the amplitude.

The pulse generator 14 detects a proper peak position from the peak output of the differentiating amplifier 12 and the gate signal output of the gate generator 13 to generate a read code pulse output 15.

Figure 3:
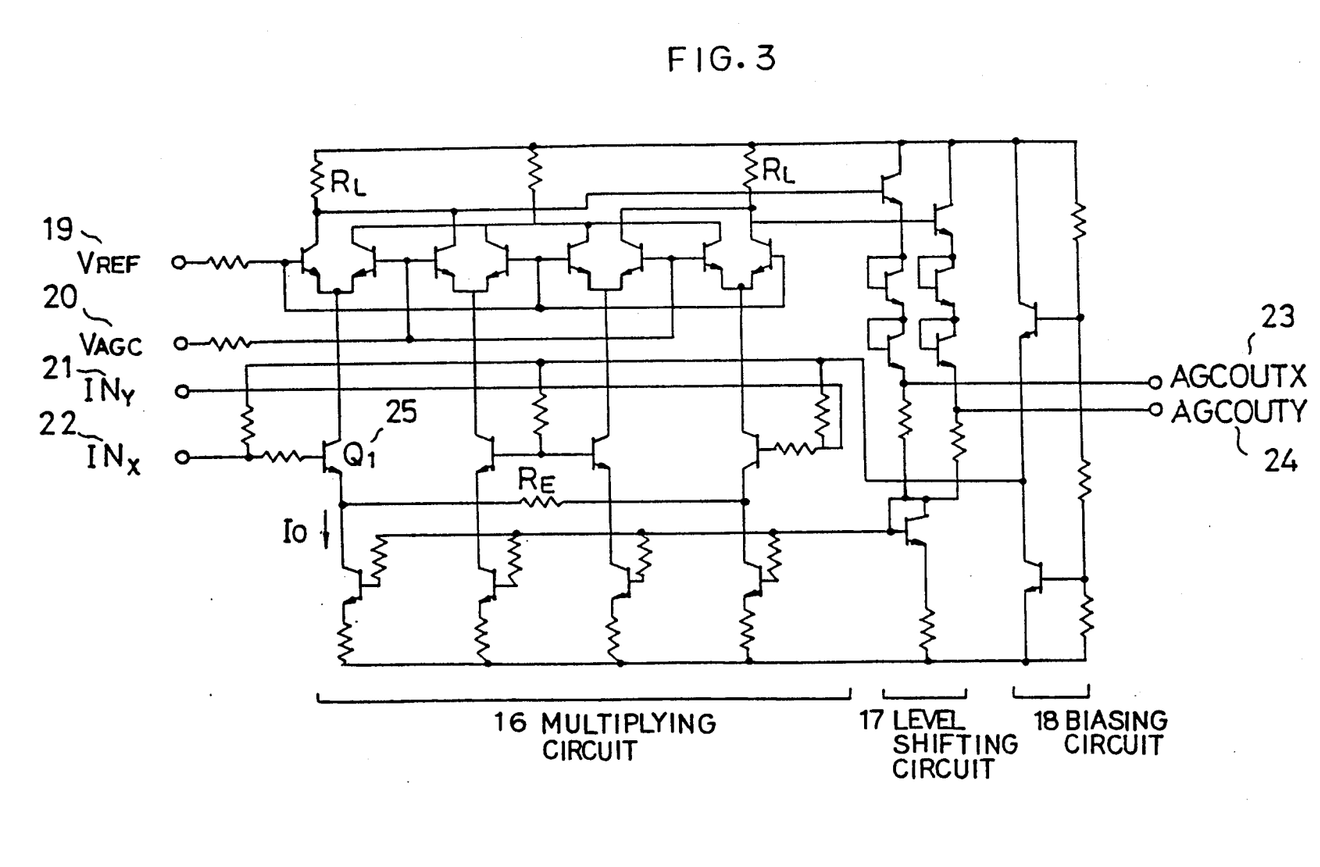
FIG. 3 is a circuit diagram showing a first stage of a GC amplifier.

FIG. 3 shows the input-side internal circuit of the GC amplifier 9.

The the input stage of the GC amplifier 9 includes a multiplying circuit 16, a level shifting circuit 17, and a biasing circuit 18.

A read signal read by the head is amplified by the read/write amplifier and is differentially inputted as the read code 5 to an INX terminal 22 and an INY terminal 21.

To a VREF terminal 19, a reference voltage is applied, while to a VAGC terminal 20, a control voltage to be outputted from the AGC 10 is applied.

The read code 5 to be differentially inputted to the INX terminal 22 and the INY terminal 21 is amplified by a gain to be determined by a differential voltage of the VREF terminal 19 and the VAGC terminal 20 and is differentially outputted from an AGCOUTX terminal 23 and an AGCOUTY terminal 24 via the level shifting circuit 17.

The operation of the multiplying circuit 16 will now be described.

A direct current signal analysis is conducted for one stage of the differential circuit to find a gain AV. A voltage Vin is expressed using INX and INY 23 as follows:

Vin=(INX-INY)/2

A collector current I1 301 of an input transistor Q1 25 is represented by Vin as follows:

$$I_1 = \frac{V_{in}}{R_{EQ} + R_E/2} \quad (1)$$

In FIG. 3, REQ is an emitter resistance of the input transistor Q1 25, RE is a resistance connected to an emitter of the input transistor Q1 25, and I0 302 is a reference current for taking charges out of the input transistor Q1 25.

Then the output is determined by the sum of collector currents of Q2 305 and Q3 306.

Using a load resistance RL 304, the output Vout can be expressed as follows:

$$V_{out} = \frac{1}{1 + \left(\frac{\epsilon(V_{AGC} - V_{REF})}{KT}\right)} (I_1 - I_0) \quad (2)$$

From the equations (1) and (2), the gain Av is expressed as follows:

$$Av = \frac{RL}{R_{EQ} + R_E/2} \cdot \frac{1}{1 + \exp\left(\frac{q(V_{AGC} - V_{REF})}{KT}\right)} \quad (3)$$

because Av=Vout/Vin. In this equation, q is an electrical quantity, K is a Boltzmann constant, and T is an absolute temperature.

The GC amplifier 9 needs a high cut-off frequency fT for a high-speed differentiation signal is inputted thereto. For satisfying various system specifications, a current drive force gm, an element precision and a characteristic to noise to obtain a wide gain control range are required.

Therefore, the first stage of the GC amplifier 9 preferably includes a bipolar transistor circuit. By using the multiplying circuit 16, it is possible to realize the GC amplifier 9 which has a high cut-off frequency fT, a wide gain control range and a high precision.

In the semiconductor integrated circuit of the illustrated embodiment, the first stage of the GC amplifier 9 is composed of bipolar transistors.

Figure 4:
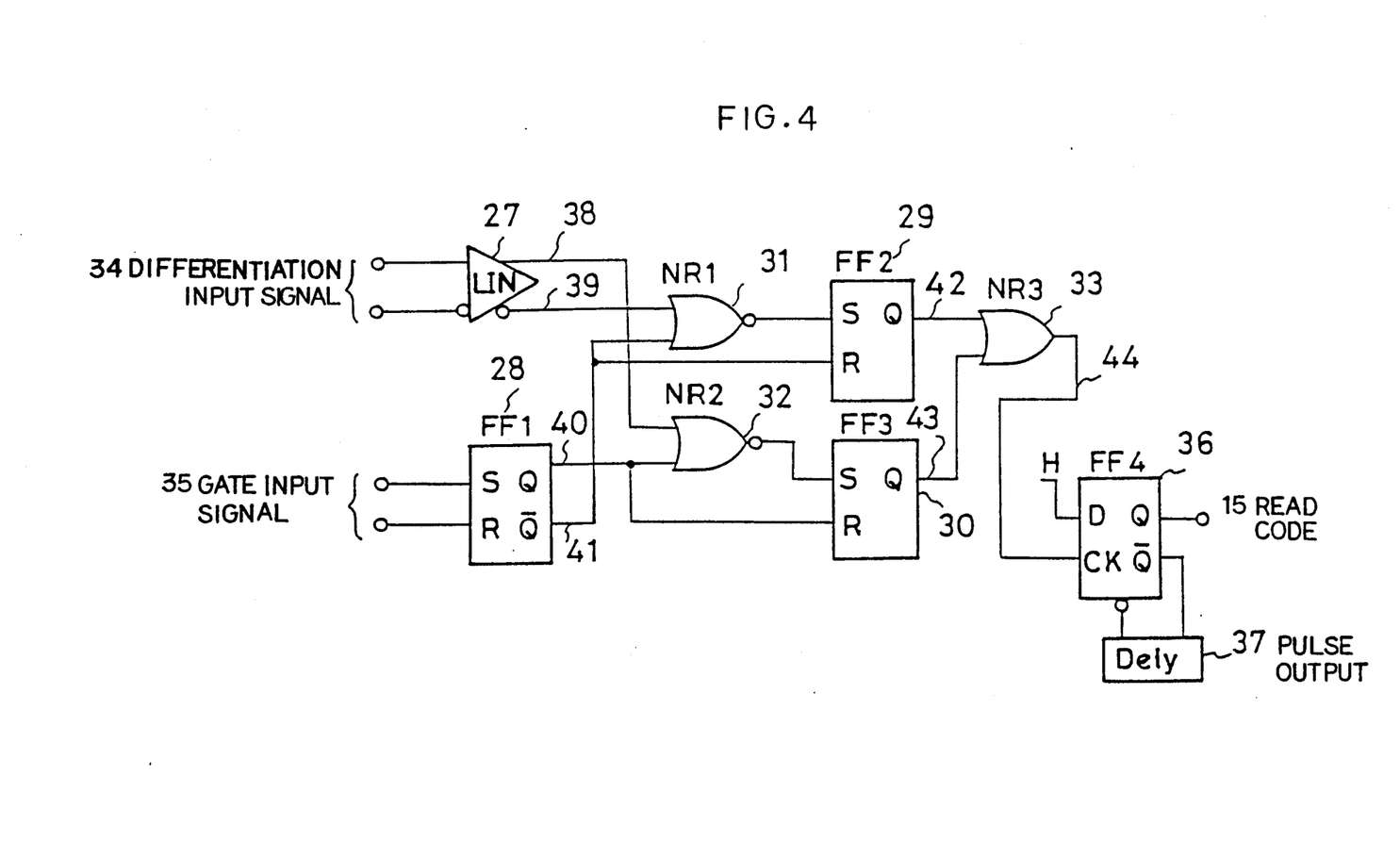
FIG. 4 is a circuit diagram showing a pulse generator.

FIG. 4 shows an internal circuit of the pulse generator 14 in the pulse detector 1.

The pulse generator 14 includes a linear amplifier LIN 27, three S-R flip-flops FF1-FF3 28, 29, 30, three logic gates NR1-NR3 31, 32, 33, a D-type flip-flop FF4 36, and a delay line Delay 37.

The signal whose peak is detected by the differentiating amplifier 12 is inputted as a differentiation input signal 34 to the linear amplifier LIN 27. The gate signal generated by the gate generator 13 is inputted as a gate input signal to the S-R flip-flop FF1 29.

Figure 5:
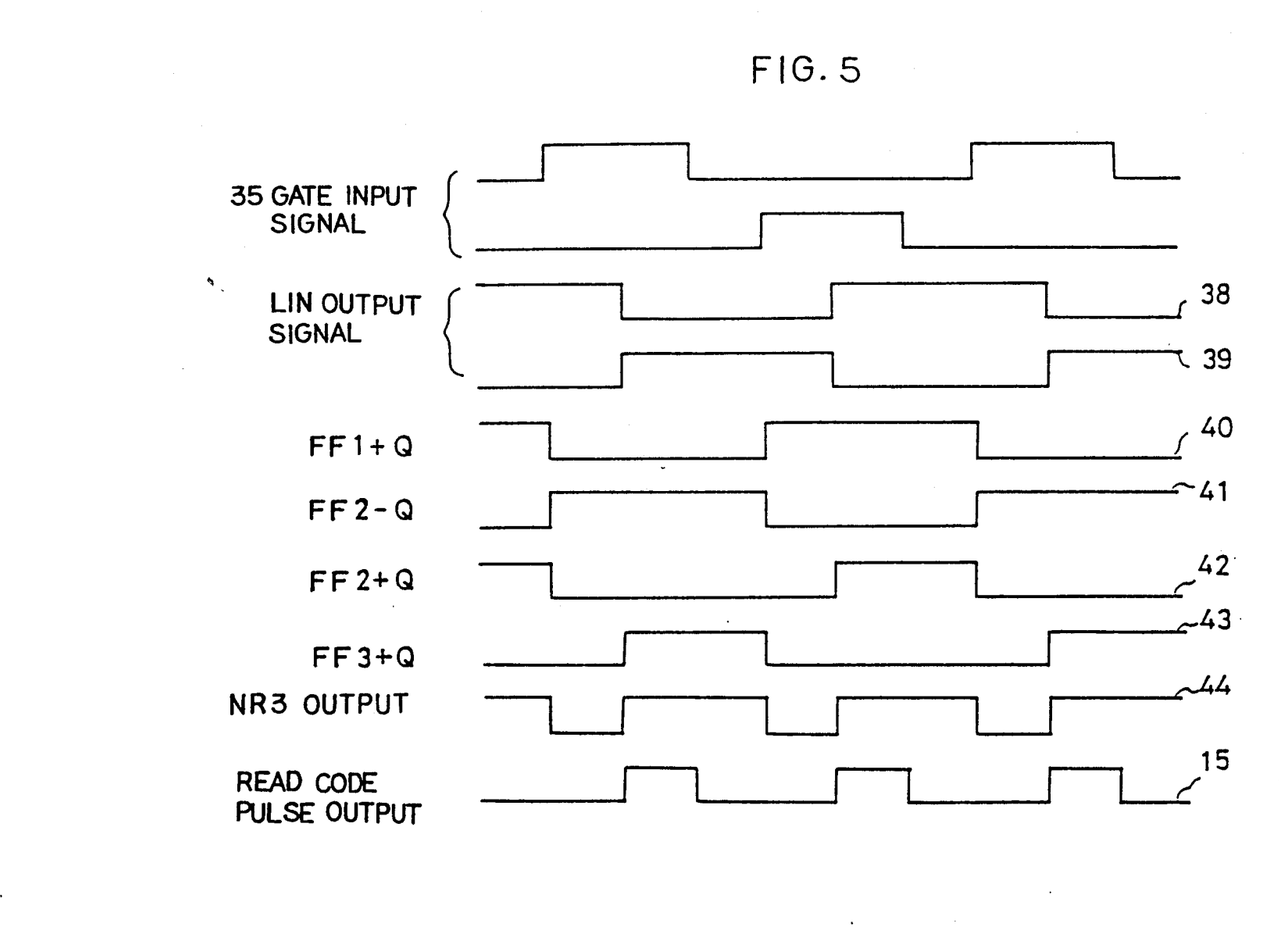
FIG. 5 is a timing chart showing the manner in which a pulse is generated.

FIG. 5 shows a timing when the read code pulse output 15 is generated on the basis of the differentiation input signal 34 and the gate input signal 35.

The gate generator 13 outputs a gate input signal 35 having a gate for the output waveform of the read code 5 which is amplified to a constant amplitude by the GC amplifier 9 and whose high-frequency component is cut off by LPF 11, at a portion thereof where the output waveform exceeds a predetermined constant amplitude. Accordingly there exists a peak in a gate period of the gate input signal 35. The differentiation input signals 34 are the signals whose zero-cross points represent the peak positions. These signals will be LIN output signals 38, 39 as its waveform is normalized by the linear amplifier LIN 27. The starting-up edge and falling-down edge of the LIN output signals 38, 39 indicate the peak positions.

From the gate input signal 35 and the LIN output signals 38, 39, only the peaks which exist in the gates of the gate signal 35 are picked out by the three flop-flops FF1-FF3 28, 29, 30 and the three logic gates NR1-NR3 31, 32, 33. The picked out peaks are pulsed and outputted by the D-type flip-flop FF4 36 and the delay line Dely 37 as the read code pulse output 15.

The majority portion of the foregoing pulse generators can be composed of logic circuits. To this end, the pulse generator is composed of CMOS gates or Bi-CMOS gates using a bipolar transistor used only for the output stage. Accordingly with this arrangement, the size can be reduced markedly, and the semiconductor integrated circuit can operates precisely at a high speed, with a low electrical power consumption.

The delay line Dely 37 to be used for pulsation is a logic cell. Thus The delay line Dely 37 can be composed of CMOS cells. By using a Bi-CMOS logic cell with a bipolar transistor incorporated therein, only for the output means of the cell, it is possible to output precise pulses, with few temperature fluctuations and little dependence on the load. If a mono-multiplier is used and if the delay line Dely 37 is programably varied, the pulsating section generates an arbitrary width of pulse.

Figure 6:
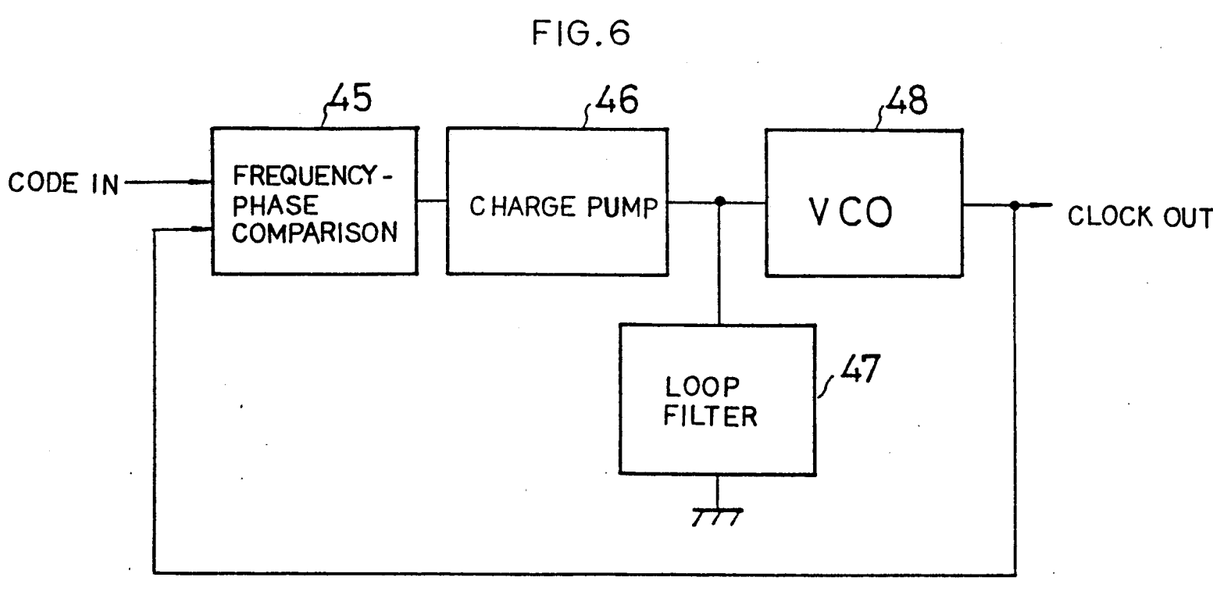
FIG. 6 is a block diagram showing a data separator (phase synchronizing circuit)

FIG. 6 shows an internal structure of the data separator 2.

The data separator 2 includes a frequency phase comparator 45, a charge pump 46, a loop filter 47 and a voltage controlled oscillator (VCO) 48.

To the frequency phase comparator 45, the read code pulse output 15 outputted from the pulse generator 14 in the pulse detector 1 is inputted as code in 49. The frequency phase comparator 45 compares the read code pulse output 15 in frequency and phase with an output clock Clock out 50 of the VCO 48, and outputs to the charge pump 46 a pulse output commensurate with the differential phase.

The charge pump 46 converts the pulse input into a current and outputs the converted current to the loop filter 47. The loop filter 47 integrates the current to convert it into a voltage and outputs the voltage to the VCO 48. The VCO 48 outputs, as the output clock Clock out 50, a clock having a frequency corresponding to the input voltage. The Clock out 50 is inputted again to the frequency phase comparator and constitutes a PLL (Phase Locked Loop) as a closed loop.

Figure 7:
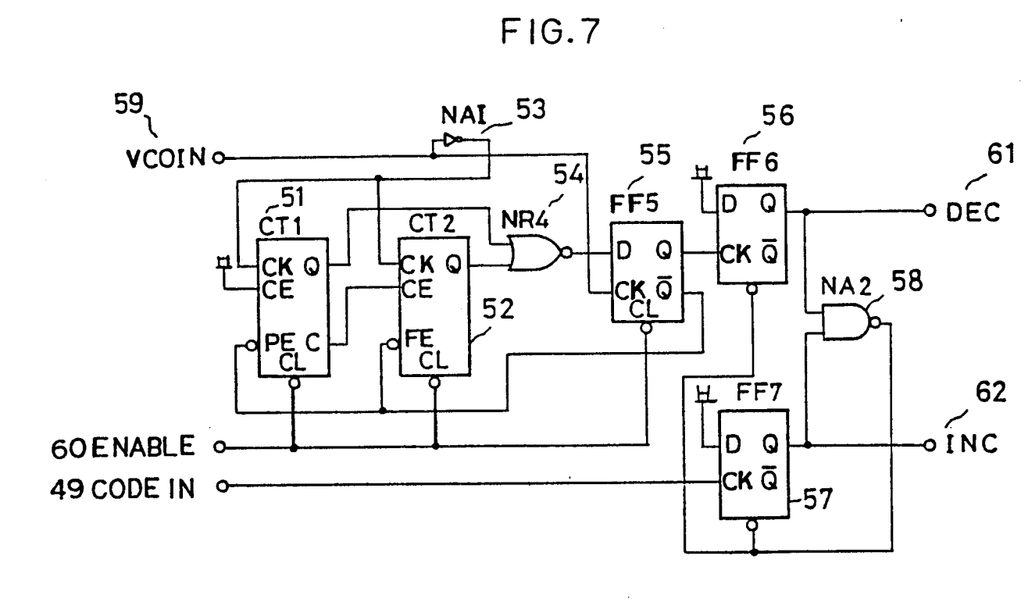
FIG. 7 is a circuit diagram showing a frequency phase comparator.

FIG. 7 is a circuit diagram showing the frequency phase comparator 45.

The output clock Clock out 50 of the VCO 48 is inputted from a VCOIN terminal 59, and the frequency of the output clock Clock out 50 is divided in thirds by two counters CT1 and CT2 51, 52 and a logic gate NR4 54 and a D-type flip-flop FF5 35, and is compared with the code in terminal 49.

When the input of VCOIN 59 is advanced in phase beyond the input of the code in terminal 49, FF6 56 outputs a DEC 61. When the input of the VCOIN 59 is delayed in phase behind the input of the code in terminal 49, FF7 57 outputs an INC 62.

This circuit makes a frequency phase comparison with respect to the input which is threefold the cycle of the clock. By varying the frequency dividing circuit, it is possible to make an arbitrary frequency comparison. Assuming that only a phase comparison is made by omitting the frequency dividing circuit, this circuit operates as a phase comparing circuit for random codes.

Each of these foregoing component circuits is constituted by a CMOS logic cell, or a Bi-CMOS logic cell using a bipolar transistor only at its output stage so that the semiconductor integrated circuit can be reduced in size and can operate precisely at high speed with a low electrical power consumption.

Figure 8:
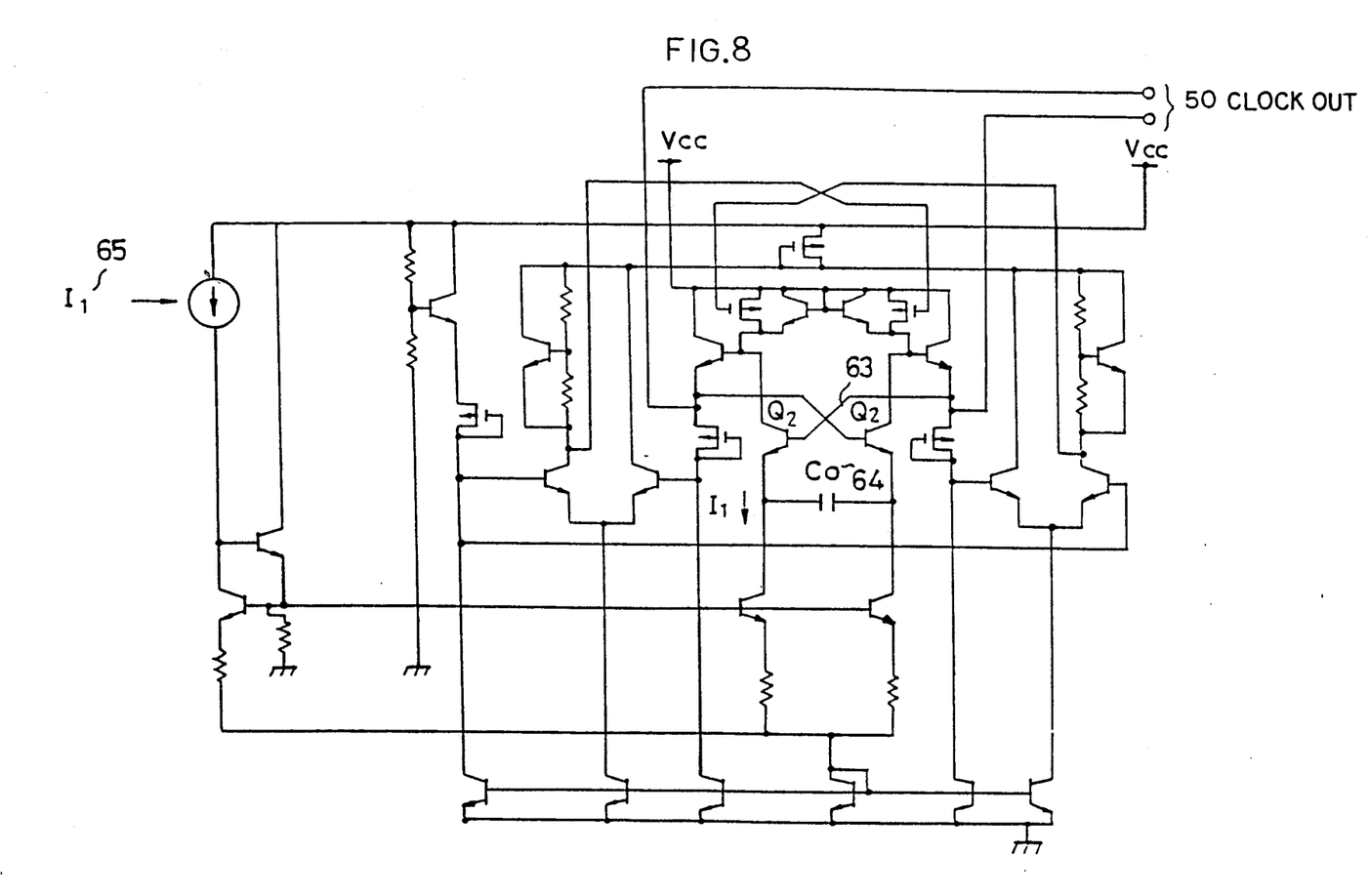
FIG. 8 is a circuit diagram showing a voltage controlled oscillator.

FIG. 8 shows a central portion of the internal circuit of the VCO 48.

Using a reference current I1 65, a voltage VBE across the base and emitter of the transistor Q2, and a timing condenser capacitance CO 65, the frequency f of the output clock Clock out 50 can be expressed as follows:

$$f = \frac{I_1}{4\ C_0 V_{BE}}$$

In this embodiment, for realizing a wide-band and high-precision VCO, this central portion is composed of bipolar transistors which has both a high precision and a high current driving force.

Figure 9:
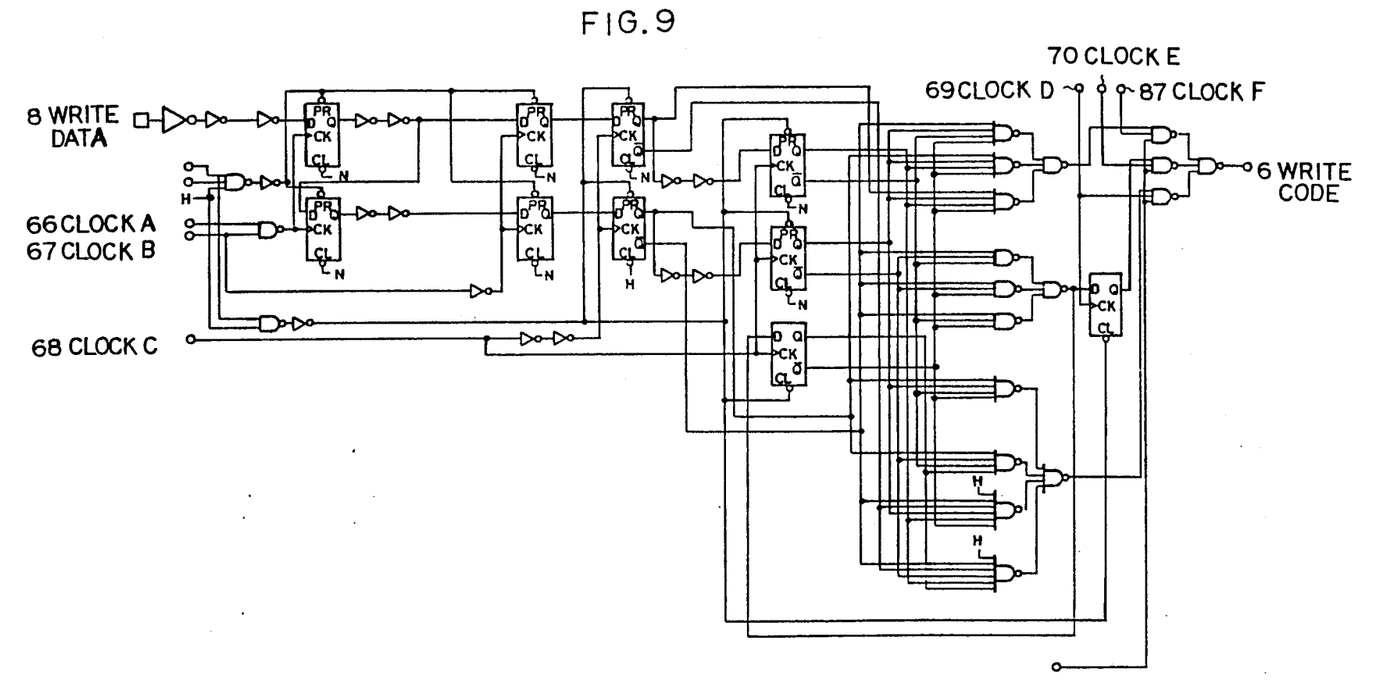
FIG. 9 is a circuit diagram showing an encoder.

FIG. 9 shows the internal circuit of the encoder 7.

The encoder 7 converts the write data 8 into the write code 6 of (1, 7) RLL code.

In operation, the operation clock of the encoder 7 is a clock having a two fold cycle for every bit of the write data 8, and a sixphase clock in which each phase is different from the phase of one bit of the write data 8 by a unit of ⅓ cycle.

In FIG. 9, Clock A 66, Clock B 67, Clock C 68, Clock D 69, Clock E 70 and Clock F 87 designate the six phase clocks, respectively.

The write data 8 are fetched bit by bit in the flip-flops 901, 902 by the NAND output of Clock A 66 and Clock B 67. The fetched data are fetched in the flip-flops 903, 904 in two-bit combination by Clock B 67. Subsequently, the fetched data are shifted to the flip-flops 905, 906 and then to the flip-flops 907, 908 by Clock C 68. The data of these flip-flops 905, 906, 907, 908 and the data of a flip-flop 909 (described below) are converted into predetermined (1, 7) codes by a conversion table. The converted data is outputted as a write code 6 at the timings of Clock D 69, Clock E 70 and Clock F 87. A portion of the encoded data are fetched in the flip-flop 909 for use in 2-bit conversion of the next.

As shown in FIG. 9, this circuit block is a perfect logic circuit and therefore composed of CMOS or Bi-CMOS logic cells, so that the semiconductor integrated circuit can be reduced in size and can operate precisely at high speed with a low electrical power consumption.

Figure 10:
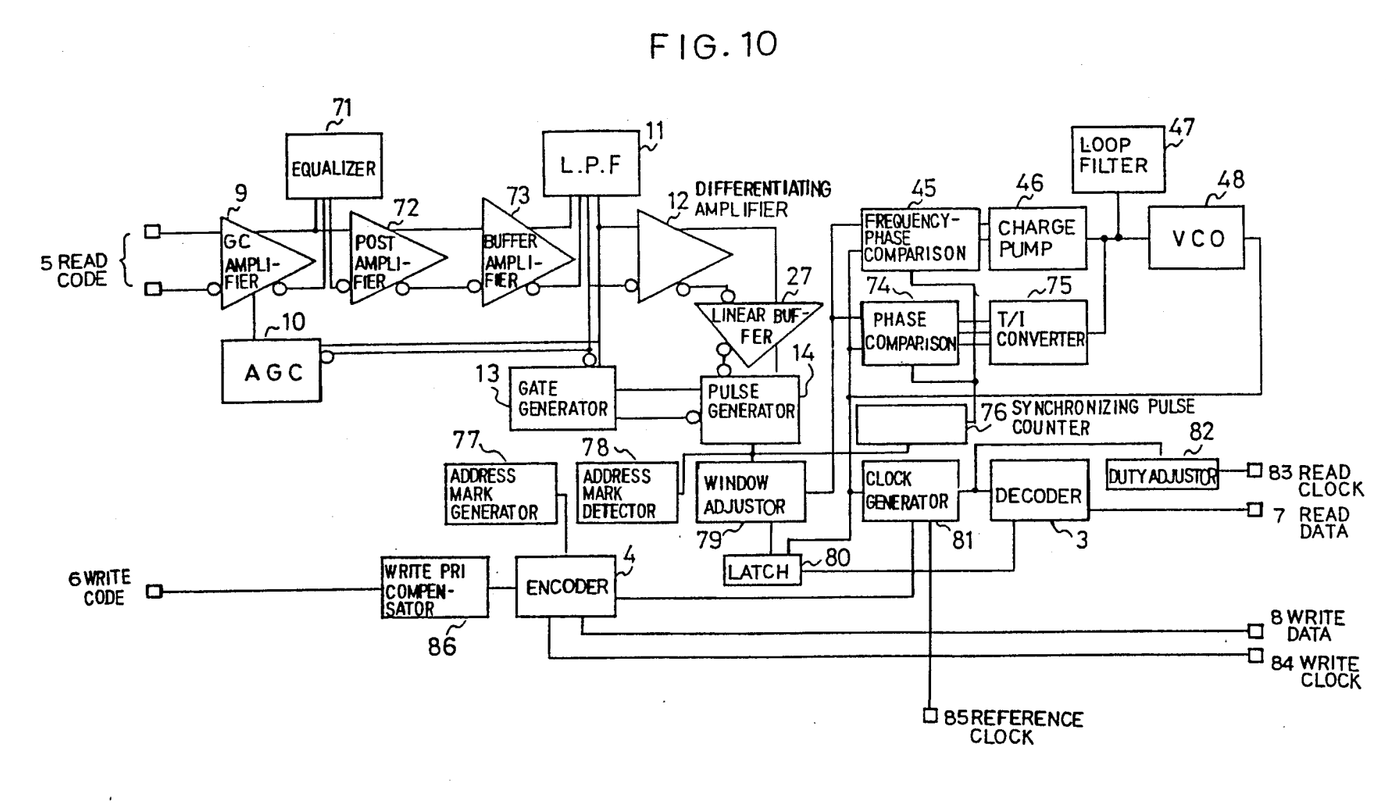
FIG. 10 is a block diagram showing a semiconductor integrated circuit having expanded functions.

FIG. 10 shows an example in which the function of the foregoing semiconductor integrated circuit is further expanded. Namely, the pulse detector 1 includes a equalizer 71 for performing an equivalent conversion of waveform, a post amplifier 72 as the input stage of the equalizer 71, and a buffer amplifier 73 as the buffer of the LPF 11.

These are all composed of bipolar transistors and passive component each of which have wide band frequency.

Further, the data separator 2 includes a phase comparator 74 for performing a phase comparison with respect to random data, a T/I converter 75 for outputting a constant current according to a control signal of the phase comparator 74, and a synchronizing pulse counter 76 for switching the frequency phase comparator 45 and the phase comparator 74 over one another.

Each of the phase comparator 74 and the synchronizing pulse counter 76 are composed of CMOS or Bi-CMOS logic cells so that the semiconductor integrated circuit can be reduced in size and can operate precisely at high speed with a low electrical power consumption. The decoder 3 includes a window adjustor 79 for adjusting a decode window, a latch 80 for fetching data, a clock generator 81 for generating an internal clock, and a duty adjustor 82 for adjusting the duty of a clock. The encoder 4 includes a write precompensator for compensating a peak shift, an address mark generator 77 for generating an address mark indicating the start of a sector, and an address mark detector 78 for detecting the address mark.

Each of the foregoing circuits are logical circuit composed of CMOS or Bi-CMOS logic cells so that the semiconductor integrated circuit can be reduced in size and can operate precisely at high speed with a low electrical power consumption.

According to this embodiment, by selectively using the bipolar transistor and the CMOS gate by the Bi-CMOS process, and by large-scale integration, the pulse detector 1 and the data separator 2 are integrated on a common chip, maintaining necessary characteristics. Also the decoder 3 and the encoder 4 are integrated on the same chip.

Figure 11:
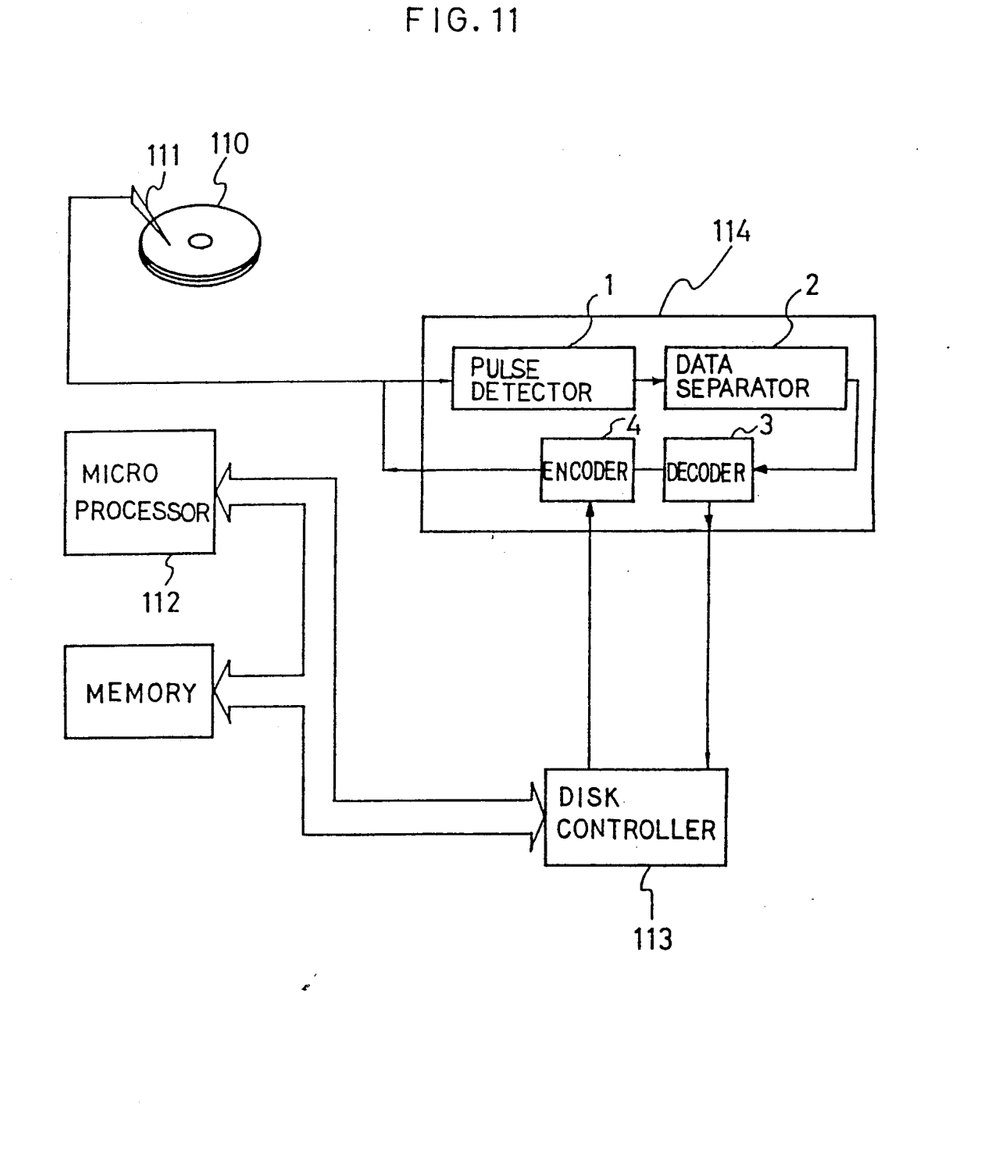
FIG. 11 is a block diagram showing a magnetic disk system using the semiconductor integrated circuit of this invention.

FIG. 11 shows a magnetic disk system in which the semiconductor integrated circuit of this invention is incorporated.

In FIG. 11, reference numeral 110 designates a magnetic disk; 111, a head to be accessed to the magnetic disk 110; 112, a microprocessor for controlling the entire system; 113, a disk control; and 114, the semiconductor integrated circuit.

In general, most of fluctuations which interrupt improving precision of the data separate portion, occurs before being inputted in the data separator. However, according to the magnetic disk system of the present invention, both pulse generator and puls separator are composed in the same chip. Accordingly, the magnetic disc system prevents the fluctuations from increasing for an original signal which is read from the disc.

In this embodiment, the semiconductor integrated circuit of this invention is applied to a magnetic disk system. This is invention should by no means be limited to this specific example. The semiconductor integrated circuit having a pluse shaping circuit and a phase synchronizing circuit may also applied to other storage system, communication systems or the like.

As described above, according to this invention, it is possible to provide a semiconductor integrated circuit which includes a waveform shaping block dealing with analog signals and a phase synchronizing block dealing with digital signals analogously and in which the individual circuit can be composed at optimum, thus guaranteeing an improved degree of performance.

What is claimed is:

1. A semiconductor integrated circuit which performs phase syncronization, comprising:
   (a) a pulse shaping circuit for transforming an input analog signal into a pulse shape signal; and
   (b) a phase synchronizing circuit for generating a clock synchronous with the pulse shape signal, said semiconductor integrated circuit being manufactured by a Bi-CMOS process.

2. A semiconductor integrated circuit according to claim 1, wherein the input analog signal is an encoded data signal, and the semiconductor integrated circuit further comprises a decoding circuit for decoding the encoded data signal by using the clock signal generated by said phase synchronizing circuit.

3. A semiconductor integrated circuit which performs phase syncronization, comprising:
   (a) a pulse shaping circuit for transforming an input analog signal into a pulse shape signal; and
   (b) a phase synchronizing circuit for generating a clock synchronous with the pulse shape signal, said pulse shaping circuit and said phase synchronizing circuit each comprising a plurality of functional circuits each of which includes, depending on a characteristic required for the respective function of the functional circuit, either one of a bipolar transistor and a CMOS gate.

4. A semiconductor integrated circuit according to claim 3, wherein the input analog signal is an encoded data signal, and the semiconductor integrated circuit further comprises a decoding circuit for decoding the encoded data signal by using the clock signal generated by said phase synchronizing circuit.

5. A semiconductor integrated circuit which performs phase syncronization, comprising:
   (a) a pulse shaping circuit including 1) a gain variable amplifier having a bipolar transistor for amplifying an input analog signal so as to have a constant peak value, 2) a differentiating amplifier for generating a differentiation signal of the output signal from said gain variable amplifier, and 3) a pulse generator having either one of a Bi-CMOS gate and a CMOS gate for generating a pulse shape signal from the differentiation signal; and
   (b) a phase synchronizing circuit including 1) a voltage controlled oscillator having a bipolar transistor for generating a clock signal, 2) a frequency phase comparator having a Bi-CMOS gate or a CMOS gate for comparing the pulse shape signal, which is generated by said pulse shaping circuit, in phases with the clock signal which is generated by said voltage controlled oscillator to obtain a phase difference therebetween, 3) a charge pump for generating a current to be converted into a voltage for controlling a clock frequency of said voltage controlled oscillator, corresponding to the phase difference obtained by said frequency phase comparator.

6. A semiconductor integrated circuit according to claim 5, wherein the input analog signal is an encoded data signal, and the semiconductor integrated circuit further comprises a decoding circuit for decoding the encoded data signal by using the clock signal generated by said phase synchronizing circuit.

7. A semiconductor integrated circuit for producing data with input signal applied thereto, comprising:
   (a) a pulse shaping circuit including
      1) a gain variable amplifier having a bipolar transistor for amplifying the input signal so as to have a constant peak value,
      2) a differentiating amplifier for generating a differentiation signal on the basis of an output signal from said gain variable amplifier, and
      3) a pulse generator having a Bi-CMOS gate or a CMOS gate for generating a pulse shape signal from the differentiation signal;
   (b) a phase synchronizing circuit including
      1) a voltage controlled oscillator having a bipolar transistor for generating a clock signal,
      2) a frequency phase comparator having a Bi-CMOS gate or a CMOS gate for comparing the pulse shape signal, which is generated by said pulse shaping circuit, in phases, with the clock signal, which is generated by said voltage controlled oscillator to obtain a phase difference therebetween, 3) a charge pump for generating a current to be converted into a voltage for controlling a pulse frequency of said voltage controlled oscillator, corresponding to the phase difference obtained by said frequency phase comparator; and (c) a data syncronizing circuit having a Bi-CMOS gate or a CMOS gate for producing said synchronized data from the pulse shape signal by employing a window which is formed according to the clock signal.

8. A semiconductor integrated circuit according to claim 7, further comprising a decoding circuit for decoding the syncronized data by using the clock signal generated by said phase synchronizing circuit.

9. A magnetic disk system comprising:

(I) a magnetic disk on which data is recorded;

(II) a magnetic head for reading the data recorded on the magnetic disk;

(III) a semiconductor integrated circuit wherein a synchronized read data is produced from the read signal which is read from the magnetic disk, comprising:

(a) a pulse shaping circuit including i) a gain variable amplifier having a bipolar transistor for amplifying the read signal so as to have a constant peak value, ii) a differentiating amplifier for generating a differentiation signal on the basis of the output signal from said gain variable amplifier, and iii) a pulse generator having a Bi-CMOS gate or a CMOS gate for generating a pulse shape signal from the differentiation signal;

(b) a phase synchronizing circuit including i) a voltage controlled oscillator having a bipolar transistor for generating a clock signal, ii) a frequency phase comparator having a Bi-CMOS gate or a CMOS gate for comparing the pulse shape signal, which is generated by said pulse shaping circuit, in phase difference with the clock signal, which is generated by said voltage controlled oscillator to obtain a phase difference therebetween, and iii) a charge pump for generating a current to be converted into a voltage for controlling a frequency of said voltage controlled oscillator corresponding to the phase difference obtained by said frequency phase comparator; and (c) a data syncronizing circuit for producing said synchronized read data from the pulse shape signal by employing a window which is formed according to the clock signal; and (III) a decoding circuit for decoding the syncronized data by using the clock signal generated by said phase synchronizing circuit.

* * * * *